US007940669B2

(12) United States Patent
Vaswani et al.

(10) Patent No.: US 7,940,669 B2

(45) Date of Patent: May 10, 2011

(54) ROUTE AND LINK EVALUATION IN WIRELESS MESH COMMUNICATIONS NETWORKS

(75) Inventors: Raj Vaswani, Portola Valley, CA (US); Sterling Hughes, Redwood City, CA (US); Jana van Greunen, Redwood City, CA (US); William E. San Filippo, III, Los Altos Hills, CA (US); George Flammer, III, Cupertino, CA (US)

(73) Assignee: Silver Spring Networks, Inc., Redwood City, CA (US)

( * ) Notice: Subject to any disclaimer, the term of this patent is extended or adjusted under 35 U.S.C. 154(b) by 134 days.

(21) Appl. No.: 12/163,904

(22) Filed: Jun. 27, 2008

(65) Prior Publication Data

US 2009/0003232 A1 Jan. 1, 2009

Related U.S. Application Data

(63) Continuation-in-part of application No. 11/818,887, filed on Jun. 15, 2007.

(51) Int. Cl.
*H04J 3/14* (2006.01)

(52) U.S. Cl. ......................... 370/238; 709/241; 455/445

(58) Field of Classification Search .................. 370/252
See application file for complete search history.

(56) References Cited

U.S. PATENT DOCUMENTS

| | | | | |
|---|---|---|---|---|
| 6,298,053 | B1 | 10/2001 | Flammer, III et al. | |
| 7,266,085 | B2 * | 9/2007 | Stine | 370/252 |
| 7,324,553 | B1 | 1/2008 | Varier et al. | |
| 2001/0033548 | A1 * | 10/2001 | Saleh et al. | 370/218 |
| 2002/0126635 | A1 | 9/2002 | Sugiyama et al. | |
| 2003/0174665 | A1 | 9/2003 | Benveniste | |
| 2006/0029074 | A2 * | 2/2006 | Bauer | 370/390 |
| 2006/0215582 | A1 | 9/2006 | Castagnoli et al. | |

(Continued)

FOREIGN PATENT DOCUMENTS

WO 93/07691 A1 4/1993

(Continued)

OTHER PUBLICATIONS

Annex to Invitation to Pay Additional Fees (Form PCT/ISA/206) from corresponding International Application No. PCT/US2008/006687 dated Oct. 24, 2008.

(Continued)

*Primary Examiner* — Seema S Rao
*Assistant Examiner* — Wanda Z Russell
(74) *Attorney, Agent, or Firm* — Buchanan Ingersoll & Rooney PC

(57) ABSTRACT

Methods and systems for providing a network and routing protocol for utility services are disclosed. A method includes discovering a utility network. Neighboring nodes are discovered and the node listens for advertised routes for networks from the neighbors. The node is then registered with one or more utility networks, receiving a unique address for each network registration. Each upstream node can independently make forwarding decisions on both upstream and downstream packets, i.e., choose the next hop according to the best information available to it. The node can sense transient link problems, outage problems and traffic characteristics. Information is used to find the best route out of and within each network. Each network node maintains multi-egress, multi-ingress network routing options both for itself and the node(s) associated with it. The node is capable of several route maintenance functions utilizing the basic routing protocol and algorithms.

16 Claims, 10 Drawing Sheets

Note: (1) AP refers to Gateway; (2) IN refers to infrastructure device node; (3) M refers to utility end-point meter node or relay; (4) BOS refers to utility back office server

U.S. PATENT DOCUMENTS

| | | | | |
|---|---|---|---|---|
| 2007/0030811 | A1 * | 2/2007 | Frei et al. | 370/238 |
| 2007/0127393 | A1 | 6/2007 | Car | |
| 2008/0089298 | A1 * | 4/2008 | Anschutz et al. | 370/338 |
| 2009/0034532 | A1 * | 2/2009 | Hsu et al. | 370/395.1 |

FOREIGN PATENT DOCUMENTS

| | | | |
|---|---|---|---|
| WO | 2004109474 | A2 | 12/2004 |
| WO | 2004109474 | A3 | 12/2004 |
| WO | 2006/124221 | A2 | 11/2006 |
| WO | WO 2007/034313 | | 3/2007 |

OTHER PUBLICATIONS

Notification of Transmittal of the International Search Report and the Written Opinion of the International Searching Authority (Forms PCT/ISA/220, PCT/ISA/210 and PCT/ISA/237) in the corresponding International Application No. PCT/US2008/006687 dated Feb. 18, 2009.

Yarvis, M. D., et al. "Real-World Experiences With an Interactive Ad Hoc Sensor Network" Parallel Processing Workshops, Aug. 18, 2002, pp. 143-151.

Karbaschi, G., et al. "A Link-Quality and Congestion-Aware Cross Layer Metric for Multi-Hop Wireless Routing" Mobile Ad-Hoc and Sensor Systems Conference, Nov. 7, 2005, pp. 649-655.

Douglas S. J. de Couto, et al. "A High-Throughout Path Metric for Multi-Hop Wireless Routing" Wireless Networks: The Journal of Mobile Communication, Computation and Information, Jul. 1, 2005, pp. 419-434.

Partial International Search Report, dated Sep. 16, 2009.

Bharghavan V et al., "MACAW: A Media Access Protocol for Wireless LAN's", Computer Communication Review, ACM, New York, NY, US, vol. 24, Oct. 1, 1994, pp. 212-225.

Banerjee S et al., "Minimum Energy Paths for Reliable Communication in Multi-Hop Wireless Networks", International Symposium on Mobile Ad Hoc Networking & Computing, [Online], Jun. 9-11, 2002, pp. 146-156.

International Search Report and Written Opinion dated Jan. 20, 2010 in International Application No. PCT/US2009/003713.

A. Joshi, U.S. Appl. No. 60/476,237, filed Jun. 6, 2003.

G. Strutt, U.S. Appl. No. 60/546,940, filed Feb. 24, 2004.

A. Joshi, U.S. Appl. No. 60/546,941, filed Feb. 24, 2004.

* cited by examiner

Note: (1) AP refers to Gateway; (2) IN refers to infrastructure device node; (3) M refers to utility end-point meter node or relay; (4) BOS refers to utility back office server NOTE: (1) Access Point refers to Gateway; (2) Constant Powered and Battery Powered Devices are two types of utility end-point meter nodes; Central Server is the utility back office server (BOS)

200

Figure 4:
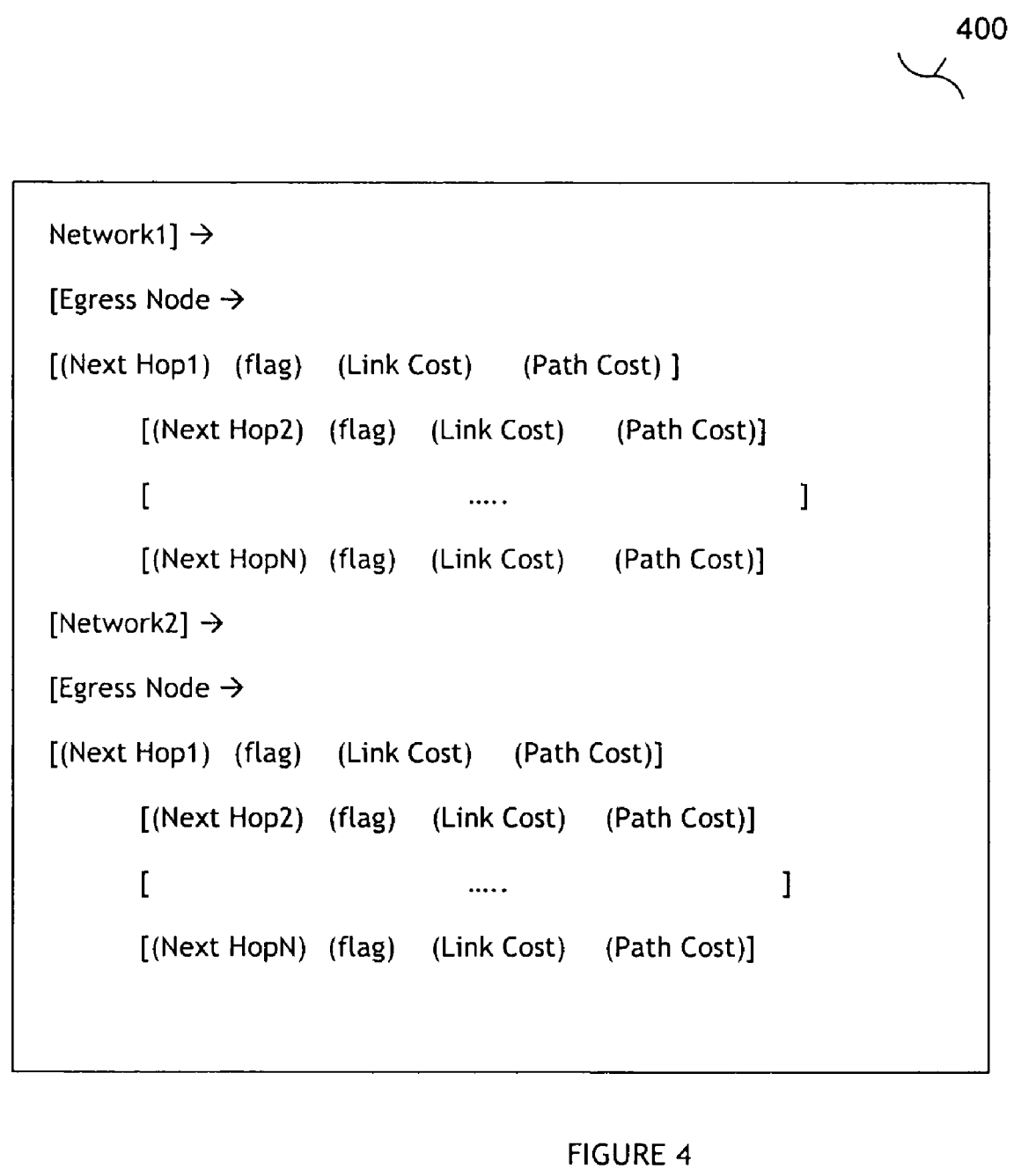

400

Network1] →

[Egress Node →

[(Next Hop1) (flag) (Link Cost) (Path Cost) ]

[(Next Hop2) (flag) (Link Cost) (Path Cost)]

[ ..... ]

[(Next HopN) (flag) (Link Cost) (Path Cost)]

[Network2] →

[Egress Node →

[(Next Hop1) (flag) (Link Cost) (Path Cost)]

[(Next Hop2) (flag) (Link Cost) (Path Cost)]

[ ..... ]

[(Next HopN) (flag) (Link Cost) (Path Cost)]

| Destination Address | Type |
| --- | --- |
| Destination 1, Next Hop 1 | Hop-by-Hop (Preferred) |
| Destination 2, Hop1, Hop2, ...HopN | Source-routed (Contingency Option) |
| Destination 3 | Direct adjacency (Preferred) |
| Destination 4, Hop1, Hop2, ...HopN | Source-routed (Contingency Option) |
| Destination 4, Next Hop | Hop-by-Hop (Preferred) |
| Destination 4, Hop 5 | Bread-Crumb (Contingency Option) |

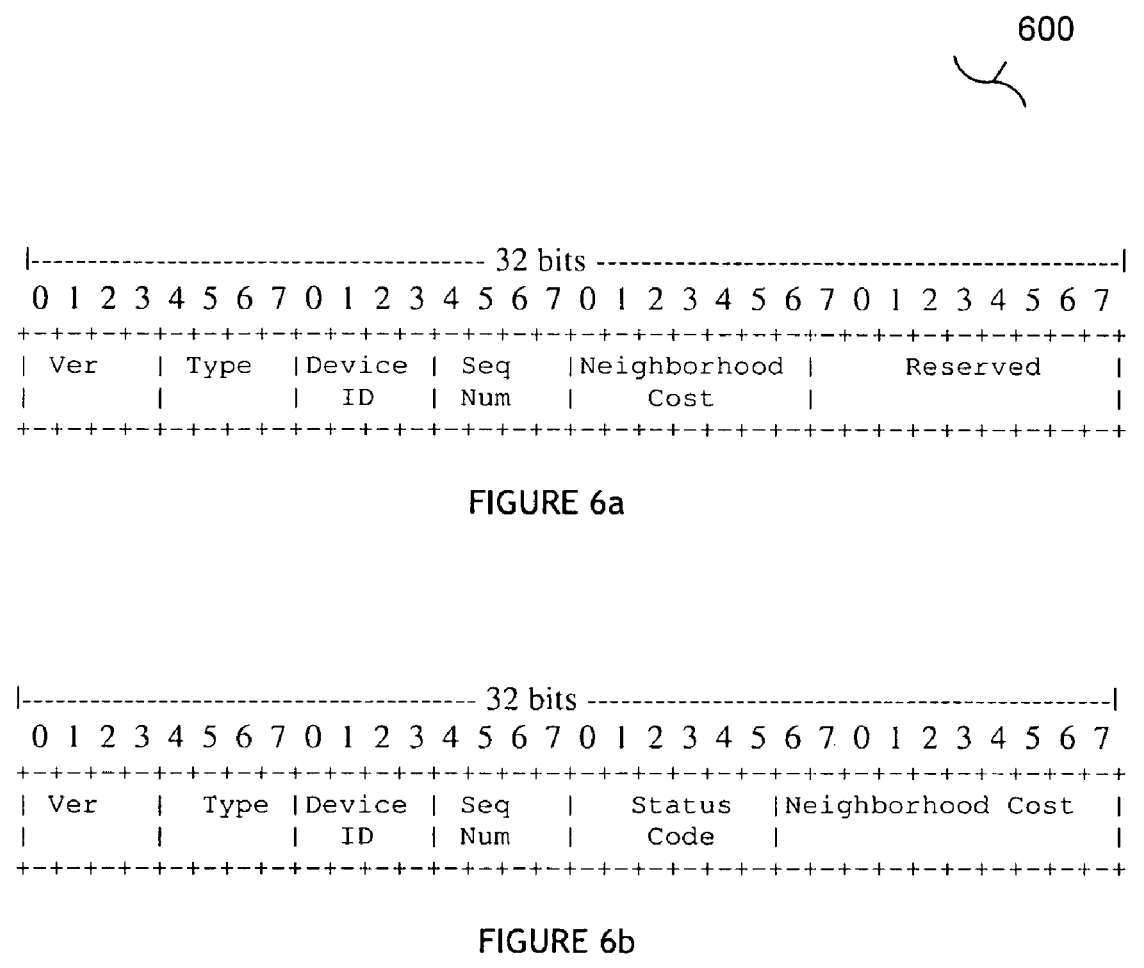

```
|------------------------------------- 32 bits -----------------------------------------|
0 1 2 3 4 5 6 7 0 1 2 3 4 5 6 7 0 1 2 3 4 5 6 7 0 1 2 3 4 5 6 7
+-+-+-+-+-+-+-+-+-+-+-+-+-+-+-+-+-+-+-+-+-+-+-+-+-+-+-+-+-+-+-+-+
| Ver   | Type  |Device | Seq   |Neighborhood |     Reserved      |
|       |       |  ID   | Num   |    Cost     |                   |
+-+-+-+-+-+-+-+-+-+-+-+-+-+-+-+-+-+-+-+-+-+-+-+-+-+-+-+-+-+-+-+-+
```

FIGURE 6a

```
|------------------------------------- 32 bits -----------------------------------------|
0 1 2 3 4 5 6 7 0 1 2 3 4 5 6 7 0 1 2 3 4 5 6 7 0 1 2 3 4 5 6 7
+-+-+-+-+-+-+-+-+-+-+-+-+-+-+-+-+-+-+-+-+-+-+-+-+-+-+-+-+-+-+-+-+
| Ver   |  Type |Device | Seq   |   Status   |Neighborhood Cost |
|       |       |  ID   | Num   |    Code    |                  |
+-+-+-+-+-+-+-+-+-+-+-+-+-+-+-+-+-+-+-+-+-+-+-+-+-+-+-+-+-+-+-+-+
```

FIGURE 6b

| Version (4 bits) | Protocol (4bits) | IP Prefix-length (1 byte) | IP ADDR (16 bytes) | Seq num ( 2bytes) | Flags (2 bytes) | (following repeats for each AP) |
|---|---|---|---|---|---|---|
| Path cost (2 bytes) | Link cost (2 bytes) | Flags (2 bytes) | Hopcount (1 byte) | Max hopcount (1 byte) | Mac address (8 bytes) | |

700

AP=Gateway

AREG REGISTRATION MESSAGE FORMAT
FIGURE 7a

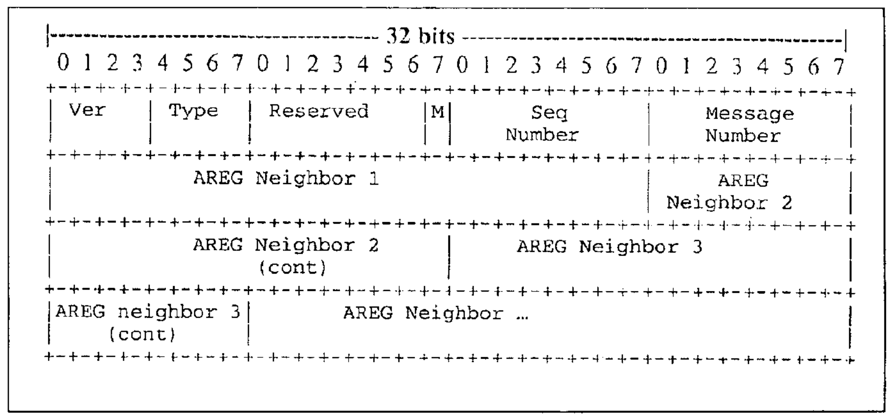

AREG MESSAGE WITH NEIGHBOR INFORMATION
FIGURE 7b

| Version (4 bits) | Protocol (4bits) | status (1 byte) | Seqnum (2 bytes) | flags ( 2bytes) | Flags (2 bytes) | IPv6 net length (1 byte) |
|---|---|---|---|---|---|---|
| IPv6 prefix length (1 byte) | IPv6 net length (16 bytes) | IPv6 prefix length (16 bytes) | | | | |

AREG ACKNOWLEDGEMENT MESSAGE WITH NETWORK ADDRESSES
FIGURE 7c

900

| | Network 1 (810) | AP1 (821) | AP2 (822) | R1(831) | R2(832) | M1(841) | M2(842) | M3(843) |
|---|---|---|---|---|---|---|---|---|
| Network1(810) | | 5 | 10 | | | | | |
| AP1(821) | 5 | | | 10 | | | | |
| AP2(822) | 10 | | | | 10 | | | |
| R1(831) | | 10 | | | 20 | 15 | 20 | |
| R2(832) | | | 10 | 20 | | 20 | 10 | |
| M1(841) | | | | 15 | 20 | | | 10 |
| M2(842) | | | | 20 | 10 | | | 30 |
| M3(843) | | | | | | 10 | 30 | |

FIGURE 9

ROUTE AND LINK EVALUATION IN WIRELESS MESH COMMUNICATIONS NETWORKS

CROSS-REFERENCE TO RELATED APPLICATIONS

This application is a continuation-in-part of U.S. patent application Ser. No. 11/818,887, filed Jun. 15, 2007, the disclosure of which is incorporated herein in its entirety by reference.

BACKGROUND

The subject matter presented herein relates generally to networks and network-based computer systems, and more particularly to methods and systems for providing network and routing protocols for utility and home area services.

SUMMARY

The exemplary embodiments illustrate a routing scheme and protocols in an RF network (terrestrial or wireless LAN) operating in FHSS mode to enable two-way communications between a utility and home devices (such as electric meters, water meters, gas meters, Distribution Automation (DA) devices, and in-premise devices) that are IP hosts in the RF LAN network, interconnecting with the Utility Host System (also referred to as Back Office Server or BOS) which is an IP host in a wireless or wired WAN (Wide Area Network) infrastructure. The IP version in the exemplary embodiment is IPv6. When traversing a typical IPv4 WAN cloud, the IPv6 packets are encapsulated in IPv4 for transmission. The method for routing IPv6 packets in the wireless LAN network includes providing a Gateway that can perform encapsulation (e.g., of IPv6 into IPv4 packets) in its capacity as the Gateway between the LAN and WAN, and providing a plurality of IPv6 endpoints or devices that appear to be directly connected to the Gateway at the IPv6 level.

Physically, the endpoints or devices are capable of establishing radio transmission paths to the Gateway directly (single hop to Gateway) or to other IPv6 devices (multi-hop to Gateway), and the algorithm and methods of this invention describe how the network topology under the Gateway is created and packets are routed using the data link layer (Layer 2 in the OSI model). Devices or nodes power up, discover available networks, select the networks to join, choose an ordered set of viable upstream candidates as their next hop in their routing scheme, register with the upstream nodes having the best path and link cost, and ultimately register with the Gateways associated with one or more of the available networks. The network discovery process conducted by the nodes insures there are routes to forward packets upstream to the Gateway for egress to the Utility Host System, while explicit registration with the upstream nodes and Gateway provides the Gateway with the most current notion of the network and insures that traffic can also flow downstream to the node. This is a multi-egress, multi-ingress routing scheme, where a node can be part of multiple networks via one or more Gateways.

In a network that is typically represented by a utility network, the distribution part of the network may include a plurality of nodes located at end-pint utility meters with a smaller number of nodes acting as relays, and one or more Gateways providing egress to these end-point nodes. The utility network may also consist of the infrastructure part (substations, feeder stations, transformer locations, generation facilities) that is populated with monitoring and control sensors. These devices may also be part of the utility network that may be directly connected to the utility server via WAN or connected to the utility server via Gateways in the wireless network. The routing algorithm may be structured in such a fashion that these infrastructure nodes, and any selected distribution end-point nodes can establish bi-directional connectivity with minimal latency and via the fastest path. In some embodiments, these infrastructure nodes and select end-point nodes can have multi-egress capability to increase network reliability.

The above and other features, including various novel details of implementation and combination of elements, will now be more particularly described with reference to the accompanying drawings and pointed out in the claims. It will be understood that the particular methods and systems described herein are shown by way of illustration only and not as limitations. As will be understood by those skilled in the art, the principles and features described herein may be employed in various and numerous embodiments without departing from the scope of the invention.

BRIEF DESCRIPTION OF THE DRAWINGS

FIG. 4 is a simplified representation of an exemplary routing table constructed at a node after it receives network advertisements from its neighbors.

FIG. 5 is an example of a list of routes of different route types that may be present at a node.

FIG. 6*a* shows an exemplary format for an "upstream registration" message sent by a node to another node upstream; FIG. 6*b* is an example format for an "upstream registration acknowledgement" message sent by the upstream node to the registering node.

FIG. 7*a* is an example format for a "Gateway registration" (AREG) message sent by a node to the Gateway it wishes to register with; FIG. 7*b* shows an exemplary format for an AREG message with neighbor information; FIG. 7*c* further illustrates the contents of an AREG acknowledgement message with network addresses.

FIG. 9 shows an exemplary map of link costs between the nodes that can establish RF communication links with each other in one possible embodiment represented in FIG. 8.

DETAILED DESCRIPTION

Figure 1A:
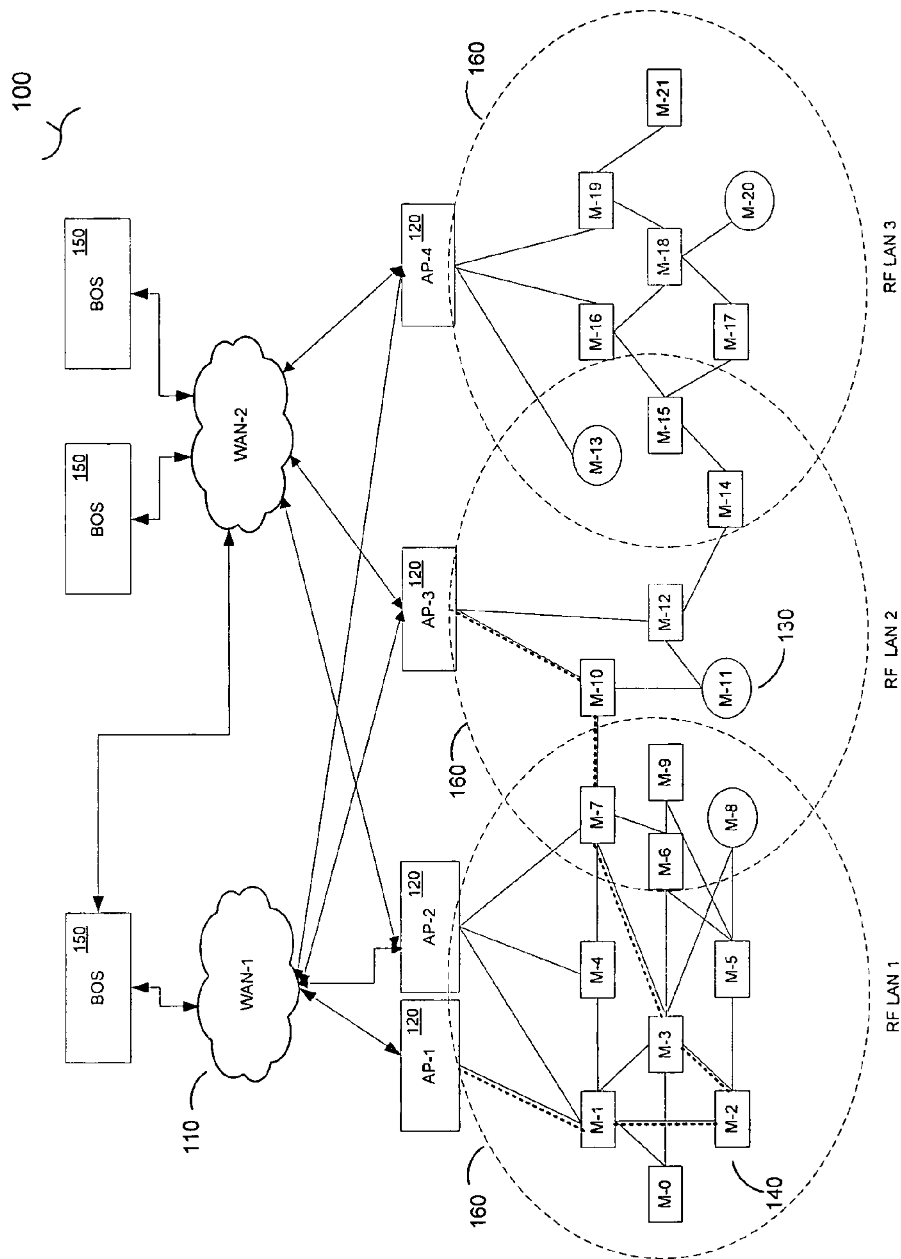
FIG. 1A illustrates the overall network architecture of one possible embodiment.

In the following description, for purposes of explanation, specific nomenclature is set forth to provide a thorough understanding of the various inventive concepts disclosed herein. However, it will be apparent to one skilled in the art that these specific details are not required in order to practice the various inventive concepts disclosed herein.

Some portions of the detailed descriptions that follow are presented in terms of algorithms and symbolic representations of operations on data bits within a computer memory. These algorithmic descriptions and representations are the means used by those skilled in the data processing arts to effectively convey the substance of their work to others skilled in the art. An algorithm is here, and generally, conceived to be a self-consistent sequence of serial and parallel steps leading to a desired result. The steps are those requiring manipulations of physical quantities.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as “processing” or “computing” or “calculating” or “determining” or “displaying” or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The subject matter presented herein also relates to an apparatus for performing the operations herein. This apparatus may be specifically constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (“ROMs”), random access memories (“RAMs”), EPROMs, EEPROMs, magnetic or optical cards, or any type of media suitable for storing electronic instructions, and each coupled to a computer system bus.

The algorithms, processes, and methods presented herein are not inherently related or restricted to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Wireless Network

Referring to FIG. 1A, a communications network may include a plurality of devices 140 and 130 (“nodes”) linked to one another (at least one or more) and to one or more Gateways within a wireless LAN 160. Unless otherwise noted, Gateway may be alternatively referred to as “Access Point” or AP. The Gateway in turn may be linked to one or more back office utility servers (BOS) 150 via one or more networks 110, typically Wide Area Networks (WANs). A back office server may be implemented on one or more computing devices, for example a utility server such as the server 150 as shown in FIG. 1B, and may be implemented across one or more networks.

Also shown in FIG. 1*a* are infrastructure device nodes 170 IN-1, IN-2, and IN-3 located in wireless LANs 1, 2 & 3. There can be many more infrastructure device nodes (“IN nodes”) spread over the wireless networks or the utility infrastructure. If these IN nodes are part of the wireless LANs, they may seek egress to the utility BOS via one or more Gateways in the wireless LAN they are part of. In some embodiments, these IN nodes may have direct access to the utility BOS via a WAN or radio backhaul. In some embodiments, the IN nodes may also be linked to one another via radio.

Figure 1B:
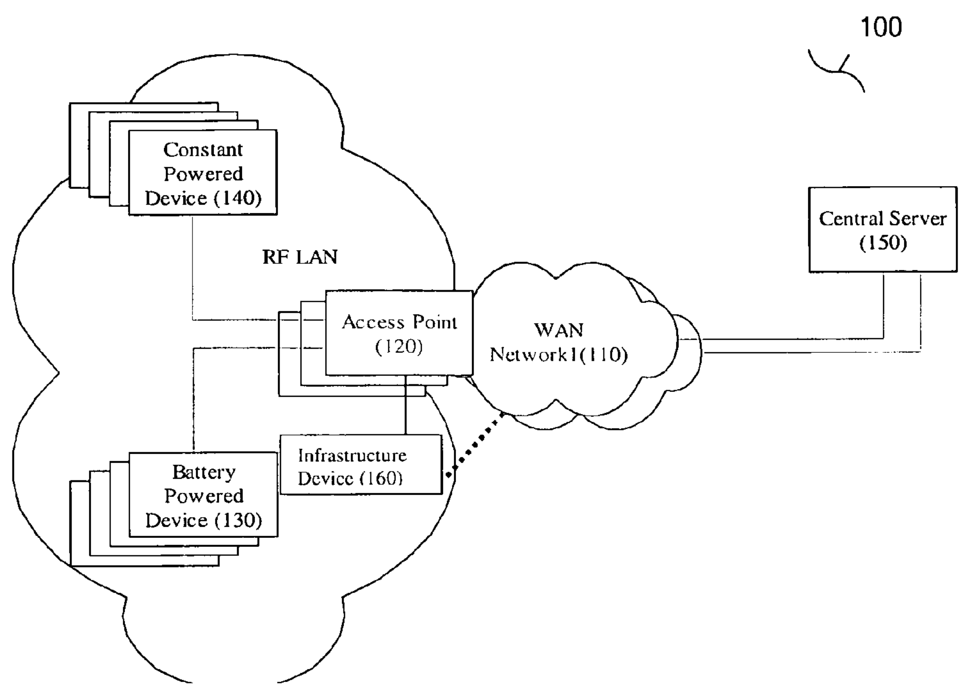
FIG. 1B is an alternate representation of the overall network architecture of one possible embodiment.

Referring to FIG. 1B, nodes, such as battery powered devices (BPDs) 130 and/or constant powered devices (CPDs) 140, and infrastructure devices 160, may discover available networks 110 by listening to all neighbors it can set up links with, may select one they should join, and may choose a set of viable upstream candidates as their next hop. Note that in one embodiment, CPDs may act as a proxy for BPDs. However, alternate embodiments may allow BPDs to participate directly as nodes in the wireless network without a proxy. In certain other embodiments, the IN nodes 160 may have direct access to the utility BOS via the WAN 110, instead of via the AP 120. In certain cases, many IN nodes are threaded together via radio add/drop backhaul system and linked to one another and the utility BOS.

Example

Node M-1, a constant powered device 140 in FIG. 1A which is a node in a wireless utility network 160, hears about access to Back Office Servers (BOS) 150 via one or more WAN network 110 (WAN-1 and WAN-2) from its neighbors, and registers with both AP-1 and AP-2 of the type Gateway 120 (with unique IP addresses) that provide egress to BOS 150 via one or more WANs 110. It does this through the upstream nodes M-5, M-6, M-18, M-2 and M-12, of the type Constant Powered Device 140 in order to communicate with BOS-1 of the type utility server 150. Each of these nodes may construct a routing table with an ordered list of next hops and corresponding link costs (adjacency cost between the local node and the next hop) and the path costs (advertised cost of egress by the next hop). Each node subsequently registers itself with its upstream neighbor and Gateway 120. Gateway 120 may keep track of the network topology and capabilities of all devices in its control, and also other devices. Nodes may maintain local state and the states of their immediate neighbors, and may periodically update their registrations.

In one embodiment, the network nodes 130, 140 and 150 may be part of one or more wireless LAN 160. In the example of a utility network, the LAN may be a neighborhood area network (NAN) corresponding to a neighborhood or service area for the utility. As shown in the example embodiment, multiple LANs may be used, which may or may not overlap, such that a given network device can be connected to (or be part of) only one wireless LAN or multiple wireless LANs. The nodes may be any type of network device. Examples of network devices, or nodes, include utility nodes, which may include a utility meter or may connect to a utility meter. A utility meter is a device that is capable of measuring a metered quantity, typically a commodity like electricity, water, natural gas, etc. Utility nodes that connect to a utility meter may include a network interface card (NIC) for communicating on a network, may include one or more RF transceivers for communicating on one or more wireless LANs, and may include one or more utility meter interface devices (a given utility node may interface with multiple meters, which may or may not meter different commodities, such as electricity, gas, water, etc.). Utility nodes may also include an in-premise device interface to connect to in-premise devices through an in-premise network (which may or may not be a wireless network). In-premise device interface connects to in-premise devices to provide a communications link between the utility node and the in-premise devices. Additionally, the utility node may provide a communications link between the in premise devices and the wireless communications network connected to the utility node. Other examples of network devices include communication devices, such as set-top boxes (as may be used in cable television or satellite television delivery), household appliances (e.g., refrigerator, heater, light(s), cooking appliances, etc.), computers or computing devices (e.g., game consoles, storage devices, PCs, servers, etc.) networking devices such as relay, Gateway, router, phones or cell phones, battery storage device, transportation devices, transportation vehicles (for example: an electric or hybrid car or other vehicle, which may or may not be able to "plug-in" to a utility grid to receive a metered/monitored commodity such as electricity), entertainment devices (e.g., TVs, DVD players, set top boxes, gaming consoles, etc.), or other devise which may be found in a home, business, roadway or parking lot, or other location. Relays 130 (one example is M3 in FIG. 1*a*) may handle communication between network nodes 140 and the Gateway 120. For example, a relay could provide communication between the network node and the infrastructure of the utility network. Unless otherwise noted, other devices in the network such as meters, electronic devices, Gateways, etc. may also perform as relays, and relays may perform the functions of other devices or software on the network. The wireless LAN 160 may be any type of wireless network, and may use any frequency, communications channel or communications protocol. In some embodiments of this invention, one or more of the wireless LANs 160 are FHSS (Frequency-Hopping Spread Spectrum) networks or DSSS (Direct Sequence Spread Spectrum) networks.

The wireless network 160 may be connected to one or more gateways 120. A given wireless network may be connected to only a single gateway, or may be connected to two or more gateways. The gateways 120 may be connected to one or more wide area networks (WAN) 110. The WANs 110 may be connected to one or more utility back office servers (BOS) 150. The back office servers may handle a variety of business or management tasks, including participation in the collection of metering information, managing metering devices, security for the network, or other functions as may be desired in an AMI network. Examples of back office systems include billing and accounting systems, proxy servers, outage detection systems (as may be used in a utility network), data storage systems, etc.

In one embodiment, the routing protocol used is a "next-hop" multi-egress/multi-ingress algorithm for determining an optimal route to/from a destination, which may use path cost and/or history of stable upstream and or downstream routing as the metric for determining the next hop for routing packets. In one embodiment, hop counts are not used for evaluating the path cost, but are used to prevent routing loops, as described below. In such an embodiment, a node may select the route with the lowest metric value of the path cost in selecting the preferred route to transmit packets.

In one embodiment, in the initial network discovery phase, a node may use a process to scan through slots or channels to get to its neighbors and to get acknowledgement responses and an initial value of link quality estimates from those discovered neighbors. This initial link quality estimate may be used to select a number of best upstream neighbors to talk to (the number selected may be configurable).

A node proceeds with the "Registration" process with its upstream nodes, when the node intends to use these upstream nodes for egress to another network. In response to the registration message from the node, the upstream node will add the registering downstream node to the downstream routing table entries maintained by the upstream node. The upstream nodes may also proceed to maintain up-to-date timing information about the registering node in response to the registering by the downstream node. Nodes routing through each other are preferably set up to exchange timing information periodically in order to remain in sync and exchange packets in the wireless network. In one embodiment, the wireless network may be based on frequency-hopping spread spectrum (FHSS). In another embodiment, the timing updates piggyback on any data transfer messages, but an explicit timing information exchange may be triggered if there has been no data exchange for a preconfigured interval (for example, on the order of 30 minutes).

The registration of a node with one or more of the Gateways may then take place. This registration process can prompt the Gateway to add the registering node to its routing table and insure that the status of the node is up to date. The registration of a node with the Gateway may occur periodically but more infrequently than the registration with an upstream node. In the presently preferred embodiment, the frequency is on the order of once every 12 hours.

Addressing

IPV6 Addressing:

Each node 130, 140 in the wireless communication network may be identified for end-to-end routing in any particular network by a unique IPv6 address. IPv6 addresses are typically composed of two logical parts: a 64-bit network prefix and a 64-bit host part. Upon successful registration by a node with the Gateway, the Gateway may hand the node data packets in the form of a TLV (Type Length Value) containing the network configuration, including the IPv6 globally routable prefix associated with the subnet the node is joining. The node may then send a Dynamic DNS update request (RFC 2136) to the Network Host Utility System (BOS) DNS server. When a utility server (BOS) 150 wishes to send traffic into the Wireless LAN, it may resolve the node's DNS name into an IPv6 address for Layer 3 (IP) routing through the WAN to the correct Gateway. If the WAN is IPv4-based, IPv6 packets may be encapsulated within IPv4 with appropriate prefixes for tunneling through the IPv4 cloud. At the BOS 150 and the gateway 120, the received IPv6 packet would be decapsulated.

A node may register with multiple networks either on the same Gateway or on multiple Gateways, in which case, it may set the priority order for the networks it belongs to based on its estimation or calculation of the lowest cost path. In the presently preferred embodiment, the node will have an IP address for each network it is registered with. The DNS server may associate these IP addresses with the node's hostname in a preferred order according to the policies defined on the DNS server. When a BOS Server in the WAN network wishes to send traffic into the wireless LAN, the DNS server goes through the candidate IPv6 addresses in order while resolving the node's hostname.

Link Layer Addressing

Each node 130, 140 may be identified for routing in the Wireless LAN by a unique link layer address assigned to its radio interface. In this embodiment, each node may have only a single interface. Other embodiments can have multiple discrete link layer addresses. Link layer address is typically 8 bytes long and is the device's MAC address. The link layer broadcast address may be hex ff:ff:ff:ff:ff:ff (all ones). Packets transmitted with this local broadcast address can be processed by those who receive them.

RF Link Layer Packet Forwarding

Figure 2:
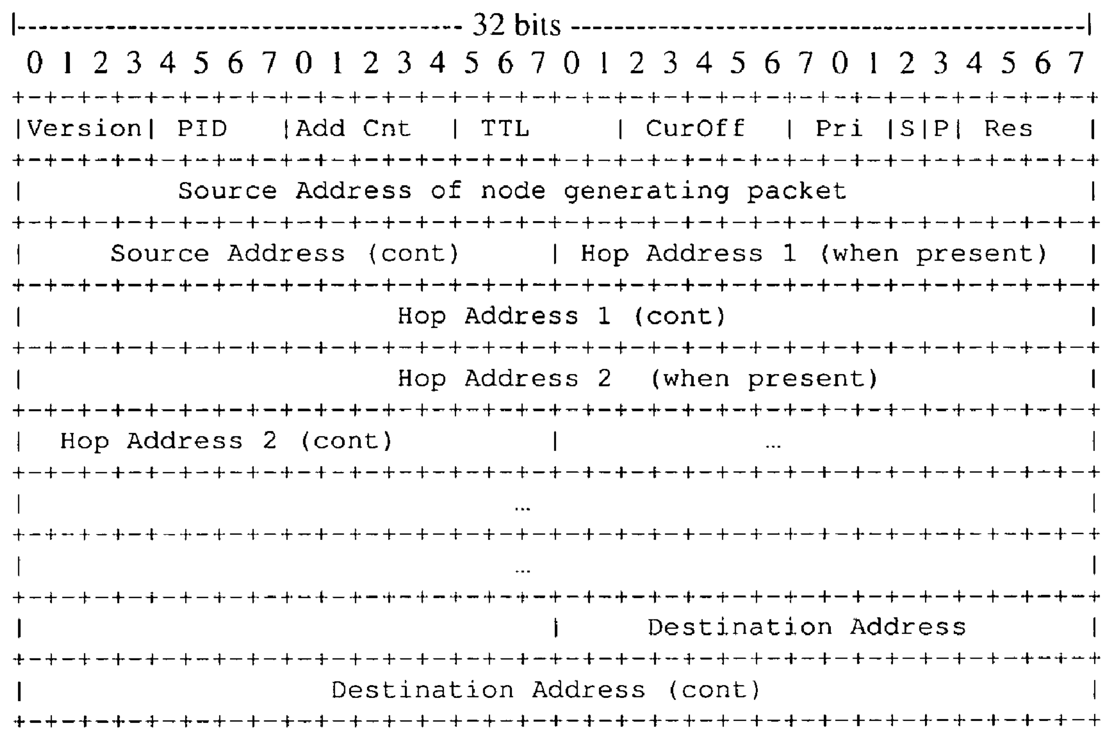
FIG. 2 is a representation of the bit by bit structure of the link layer header of a packet being routed.

FIG. 2 illustrates the bit composition of the link layer header that may carry the information as explained in Table 1 below. Also described in the Table are the flags carried by the link layer header.

TABLE 1

| Bit(s) | Name | Description |
|---|---|---|
| 0-3 | Version | Protocol version number. If a higher version is received, the frame is discarded. |
| 4-7 | Protocol Id | Higher layer protocol id:<br>0x03: SSN routing protocol<br>0x04: IPv4 Networking protocol<br>0x06: IPv6 Networking protocol<br>0x07: Datalink trace |
| 8-12 | Address Count | Indicates the total number of addresses contained in the data link header, including the source, destination and any intermediate addresses for source routed packets |
| 13-17 | TTL | This is set when the packet is generated. The initial value is set to 'Default TTL' and is configurable. The TTL is decremented every hop that the packet traverses. |
| 18-22 | Current Offset | Set to 0 on packets that don't use source routes. This is set to 0 when the packet is first sent into the network. It is incremented at every hop the packet traverses. |
| 23-25 | Priority | The DLC layer supports 8 levels of priority, this field maps directly to those priorities. |
| 26 | Source Route Bit | Indicates whether the packet contains the entire hop-by-hop route to be used between source and destination. |
| 27 | Preserve Source Route | Set when the L2 forwarding code should preserve elements in the source route when forwarding a packet downstream. If this is not set, the L2 forwarding code may strip out intermediate hop addresses once it has made a forwarding decision. |
| 28-31 | Reserved | Reserved for future use |

As illustrated in FIG. 2, the flags are followed by the source address of the node generating the packet. In one embodiment, the source address of the flag may not be set to the broadcast address.

As illustrated in FIG. 2, the source address may be followed by the address of the next hop the packet is to be sent to. In one embodiment, if the Source Route bit is set then the entire list of hop addresses ending in the destination address can be included, otherwise only the one next hop can be specified. In either case, the final address is the destination the packet is to be routed to.

If the source route bit is set, the packet header can contain the full path the packet will take. Note that a packet can be source routed between two nodes with no intermediate hops (i.e., Add Count is 2, and the destination address is either a node or broadcast address). This is a mechanism that may be used to interrogate individual nodes 130, 140 from a terminal such as a debugging mobile station.

If the source route bit is not set, the L2 forwarding code on a node may make a decision based on the value of the Address Count field. For example, if the Address Count is equal to 1 on a packet being sent from the RF LAN towards WAN network (110) or utility Server (150), it means the packet can be forwarded to any egress node or Gateway in the system. If the Address Count is greater than 1, it means that all additional addresses in the forwarding table at the node are allowable L2 egress destinations. The addresses in the forwarding table for a network can be ordered by preference, from least desirable to most desirable.

If the Address Count is greater than 1, the packet can be rerouted to a different L2 destination in case of congestion or failure. When a different L2 destination is chosen, the previous network should be removed (either by decrementing Current Offset or zeroing out the previous field). Removing the previous network is intended to help reduce the occurrence of routing loops, where a packet could be re-injected further away from the destination than the original source.

The TTL may get decremented when a packet goes through a node's L2 forwarding. Packets going through L2 forwarding can be dropped when the TTL becomes zero; messages with a zero TTL destined to the local host can be delivered up the stack. Nodes 130, 140 that are sending messages to the Gateway 120 without using full source route may set TTL to be at least the number of hops on the longest path they have leading to the Gateway 120. The maximum TTL may be configured by the administrator. In one embodiment, packets sent with the destination address set to L2 broadcast are not forwarded.

Delivery of unicast packets can be acknowledged by the DLC (Data Link Control) layer. Broadcast packets may be implemented as unicast packets in the FHSS scheme, and can also be acknowledged. It may not be possible to send unacknowledged unicast packets. When a node 130, 140 sends packets to a neighbor, the MAC layer may report the number of retries and the eventual success of the transmission. The network layer may keep counters of this information on a per-neighbor basis.

Routing Subsystem

In one embodiment, the routing subsystem may be divided into four functional components:

- neighbor scan and discovery
- neighbor maintenance
- node registration with upstream neighbors
- node registration with the Gateway One embodiment of the routing subsystem can utilize the code entity DLF (Data Link Forwarder) for Layer 2 routing and the code entity MLME (Media Access Control Sub-Layer Management Entity) for acquiring neighbor nodes and maintaining timing information between neighbors. The DLF interfaces to the MLME through a set of APIs.

Neighbor Scan and Discovery

Nodes such as CPD 140 (FIG. 1*b*) may initiate network discovery when, for example:

- It has no viable egress nodes (it is not associated with any Gateways)
- Communications with upstream nodes have been severed, either administratively, or due to part failure or propagation loss
- A periodic registration message to one of its Gateways has failed at least 3 times
- A new network is advertised Nodes such as BPD 130 may initiate network discovery, for example, if the link to its nominated master (CPD node 140) has been severed.

In the example embodiments, a node may discover neighboring nodes using two basic processes: broadcast discovery and neighbor queries. When a node comes up, the MLME may find all of the node's adjacencies (or directly connected RF links) through a "broadcast discovery process". It may do this randomly to determine when it should start sending broadcast discovery frames and then choosing the channel on which to send the broadcast discovery frame (channel selection may be done randomly). It may then cycle through every slot, transmitting each successive broadcast discovery frame on the next slot, wrapping at the last slot. In one embodiment, this process can guarantee that a broadcast discovery frame is sent on every channel in the hopping sequence of the FHSS-based network.

In the exemplary embodiments, there can be two modes to broadcast discovery: aggressive and passive. When powered on, the device node may enter aggressive discovery mode where it sends out discovery frames at randomized intervals that may be in the order of milliseconds. It may enter passive discovery mode when the aggressive discovery duration has expired. In passive discovery mode, a node may wait a much longer time between sending broadcast discovery frames, typically of the order of minutes.

Once the discovery process has found a neighbor (adjacency), or a set of neighbors, the MLME may then query the discovered neighbors for their direct neighbors (the direct neighbors can be provided in response). This may be done to discover the network environment more quickly (in contrast to broadcasting a large number of frames in hopes of contacting any one particular device). The neighbor query mechanism can be a simple query/response: a node receiving a neighbor query applies the criteria to the nodes in its list and, the nodes that "match" the criteria are placed in the neighbor response. If no criterion is given, all the nodes in the list may be placed in the neighbor response.

The MLME may notify the DLF when discovery is over i.e. the nodes have been queried for their neighbors and an attempt has been made to reach those neighbors.

Using the list of neighbors built up by the MLME, the DLF may try and find advertised egress routes. It may accomplish this task by listening for "Network Advertisement" (NADV) messages from the nodes in the MLME's neighbor table.

Figure 3:
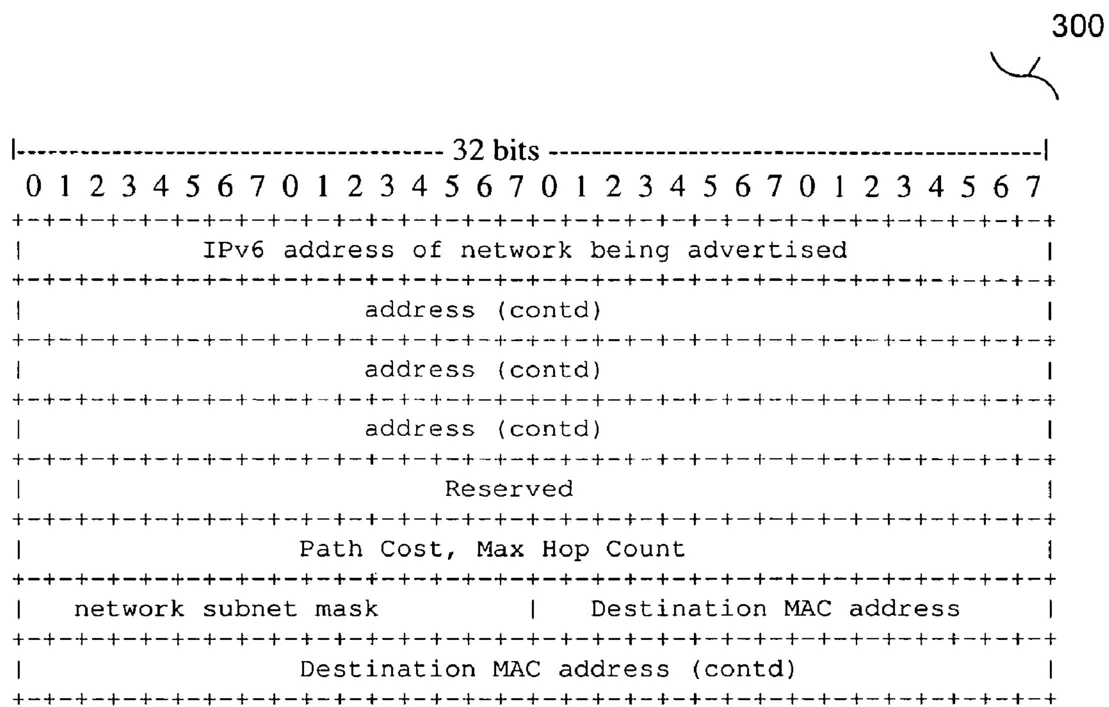
FIG. 3 shows an exemplary format of the Network Advertisement message sent out by a node about the best path to a particular network known by it.

The NADV message may advertise a set of egress routes, which may include the path cost and hop count of the egress routes. Path cost can be the lowest cost associated with that egress (Gateway), amongst all candidate paths. Hop count can be the highest number of hops that are taken to reach that egress. Hop count can be used to prevent routing loops, and may not be used in conjunction with the path cost. An example of the format of the NADV message is shown in FIG. 3. The Destination MAC address can be the MAC address of the node originating the network advertisement. In most cases it can be the egress point (or the Gateway) since networks can be identified by their egress nodes.

From the advertisements received in the form of NADV messages, each node can construct a routing table listing the networks available, the egress node (Gateway) identifying each of the networks, and the available paths to that egress node. Each of the available paths can be described with a next hop, flags describing the type of path, and the link and path costs. The flags can indicate the kind of route—whether it is a permanent entry in the table, whether it can be advertised by the node etc. In one embodiment, the node can decide to register with that upstream node for which the total cost (link and path costs) to the network is the least. Other embodiments may use other criteria including validated reliability of the link in providing long-term egress to the network. An example of the information that may be captured in the routing table is laid out in FIG. 4.

From the routing table information, nodes may construct a forwarding or next-hop table with a list of destination MAC addresses, a type associated with each address, and the path cost for it. In one embodiment, the type reflects the selection preference associated with the destination and may be one of the five: source-routed, hop-by-hop, direct adjacency, breadcrumb, or local. FIG. 5 provides an example of the route types that may be listed. In one embodiment case of a destination of the hop-by-hop type, it can be listed along with the next hop from the source node. In the case of a destination of the source-routed type, an array of hops can be explicitly stated with the destination in the forwarding table. Multiple entries for the same destination may be listed in the order of preference, which may be determined both by the type flag and the path cost. In one embodiment, when trying to reach Destination 4, the node can first use one of the hop-by-hop entries that are maintained in a linked list in order of increasing path cost. In other embodiments, the routing algorithm allows for the routing information maintained at the source node to create a source route entry for Destination 4, by structuring a forward set of paths to the destination address. Yet, in other embodiments, the node can use the breadcrumb route it had picked up from passing traffic at some point in time.

Neighbor Maintenance

In one embodiment, upstream and downstream neighbors can be constantly maintained via MLME beacons or targeted periodic keep alive messages used for synchronizing the clocks and assuring that nodes can still exchange packets with each other. This constant contact and feedback may be used by the L2 routing layer for multiple purposes, which may include:

Neighbor updates are communicated to downstream devices in timing update beacons.

Nodes use the MLME to detect if their downstream or upstream node is still functioning.

A node's upstream link characteristics may change, for example, when:

Upstream node is no longer available

A new preferred upstream node is detected

Link quality changes (smoothed over time) have taken place

In one embodiment, these rules can be applied recursively, to all upstream nodes in a path. When an adjustment occurs, the node recalculates the costs to each of its egress nodes. When a node's cost to its upstream node significantly changes the cost to one of the networks it routes through, it can distribute this information in the next set of MLME beacons to its downstream nodes.

In one embodiment, a change in network information can be propagated with a "Neighbor List" message, with the protocol type field set to 0x2 indicating that a partial list of changes is being distributed. In one embodiment, this can reflect adding new networks or changing the cost of existing networks. When an upstream node disappears, causing a particular network effectively become no longer routable, a "Neighbor List" message can be sent with the protocol type set to 0x3 to indicate that the network has been removed from the upstream nodes network list.

In one embodiment, each Gateway is notified about changes in network topology by the periodic network registration messages that are unicast to it. These messages may be sent by every node within the Gateway's network, and may contain a complete list of their upstream nodes, and the link costs to each of them.

In one embodiment, the MLME keeps two smoothed averages that can be used by the DLF for determining link costs for routing purposes: a smoothed RSSI and a smoothed info success percentage. The term "smoothed" refers to the type of averaging done on the data. In one embodiment, the averaging uses the formula: smoothed average=A*average+B*sample; B=(1−A). This type of averaging does not require a large amount of memory for storage (as opposed to storing the last N samples) and also has a controllable amount of "history". The term history refers to how much the new value affects the current smoothed average. This may be controlled by the A and B values: large A values mean that the average has more history than smaller A values. Other embodiments can use other averaging techniques that are desirable under the prevalent network conditions.

The RSSI is the received signal strength indicator. This value may be measured for all frames received from a node. In some embodiments, it only has limited use in link quality calculations as it may not give a clear indication of the bit error rate of the link. When any frame is received from a node, the RSSI of that frame can be averaged into the smoothed RSSI using the averaging formula.

In one embodiment, the "info" success percentage criterion can be used as the best measure of link quality and therefore in making routing decisions. The "info" success percentage is a form of packet success rate. The term "info" is used to denote frames other than the ones that started the communications. The first frame sent to a node targeted on its hopping sequence can fail due to interference or due to the receiver being busy. The info success percentage, in including only those frames that the targeted node is listening for and not the frames at the start of the communications, provides a link quality measure that may not vary greatly with the load of the receiver. The info success percentage may be a better indicator of link quality.

Node Registration with Upstream Neighbors

Each node may explicitly register with the upstream nodes it intends to use in a network. This registration means that the upstream node may now attempt to keep up-to-date timing information about the registering node, and keep a downstream routing table entry. Thus, traffic cannot only flow towards the egress, but also back to the node (downstream).

The node registers with its upstream node by sending it an "Upstream Register" message. The "Upstream Register" message may contain the device's type, and a neighborhood health metric. The neighborhood health metric can be used to cull downstream nodes when an upstream becomes overloaded. Devices with a low neighborhood health metric (and therefore presumably low path diversity) can be preferentially selected before devices with high neighborhood health metrics.

An exemplary format for the "Upstream Registration" message is specified in FIG. 6*a*. The message type indicates it is an upstream registration. The neighborhood cost is the neighborhood health metric based upon a combination of the numbers of potential and active upstream nodes.

Potential upstream nodes either positively or negatively acknowledge "Upstream Register" message using an "Upstream Registration Acknowledgement" message. A device's "Neighborhood Health" can be updated based on the value of this acknowledgement. Potential upstream nodes can give less weight than acknowledged upstream nodes.

An exemplary format for the "Upstream Registration Acknowledgement" message is given in FIG. 6*b*. The type indicates that it is an "Upstream Registration Acknowledgement" message. The "Seq Num" is the sequence number sent by the requester in the "Upstream Registration" message. The status code of the response can be one of the following:

0x0, Node successfully added

0x1, Node failed to be added

0x2, Node rejected due to high load

0x3, Node is already being maintained

Node Registration with AP

A node can register itself with a Gateway by sending a unicast "AP Register" message (AREG). The AREG message can contain the list of addresses of nodes in the Gateway's network that the registering node uses as upstream nodes, and the link cost associated with each of these upstream nodes. It may also contain a list of other candidate networks (represented by the egress nodes of those networks), and their cost.

An exemplary format of the AREG message is given in FIG. 7*a*. The Type can be set to indicate it is an AREG message. The M bit can be set if there is more data to send. Seq Number can be the sequence number of the registration message. Message number can be used when the registration message is sent in multiple parts. Each AREG Neighbor can describe an upstream node in the paths used by the registering node.

An exemplary format for an AREG Neighbor description within the AREG message is given in FIG. 7*b*. The MAC address can correspond to the upstream node or a network egress point that the registering node is informing the Gateway about. Cost can be the recorded cost to either the upstream node or the network egress point being described. The E bit is the Network Egress Node bit. It may be set if the neighbor description represents a network egress node and not an upstream neighbor.

In one embodiment, when the node is successfully registered with the Gateway, the Gateway can place the node in its routing table, and keeps an up to date state on the node. The node can send periodic registration messages to the Gateway (on the order of every 12 hours.) The Gateway may update its routing table when it sees subsequent Gateway (AP) registration messages. If the Gateway misses three consecutive registration messages, the node may be culled from the Gateway's routing table, and the node may need to re-register itself.

In response to a successful first time registration, the Gateway can send down a set of TLVs containing any network configuration information. This list may include, among other things, the Gateway's globally routable IPv6 prefix, Gateway's MAC address, DNS server address, network transmission timers and any other variables relating to L2/L3 routing. FIG. 7*c* is an example gateway AREG message to the registering node with network addresses.

If a Gateway becomes overloaded with too many nodes it can begin to cull nodes that have other candidate networks. It may evaluate this by looking at the different networks reported in the AREG messages, and may remove the healthiest candidates from the network, and notify them of any such action taken.

Example

Figure 8:
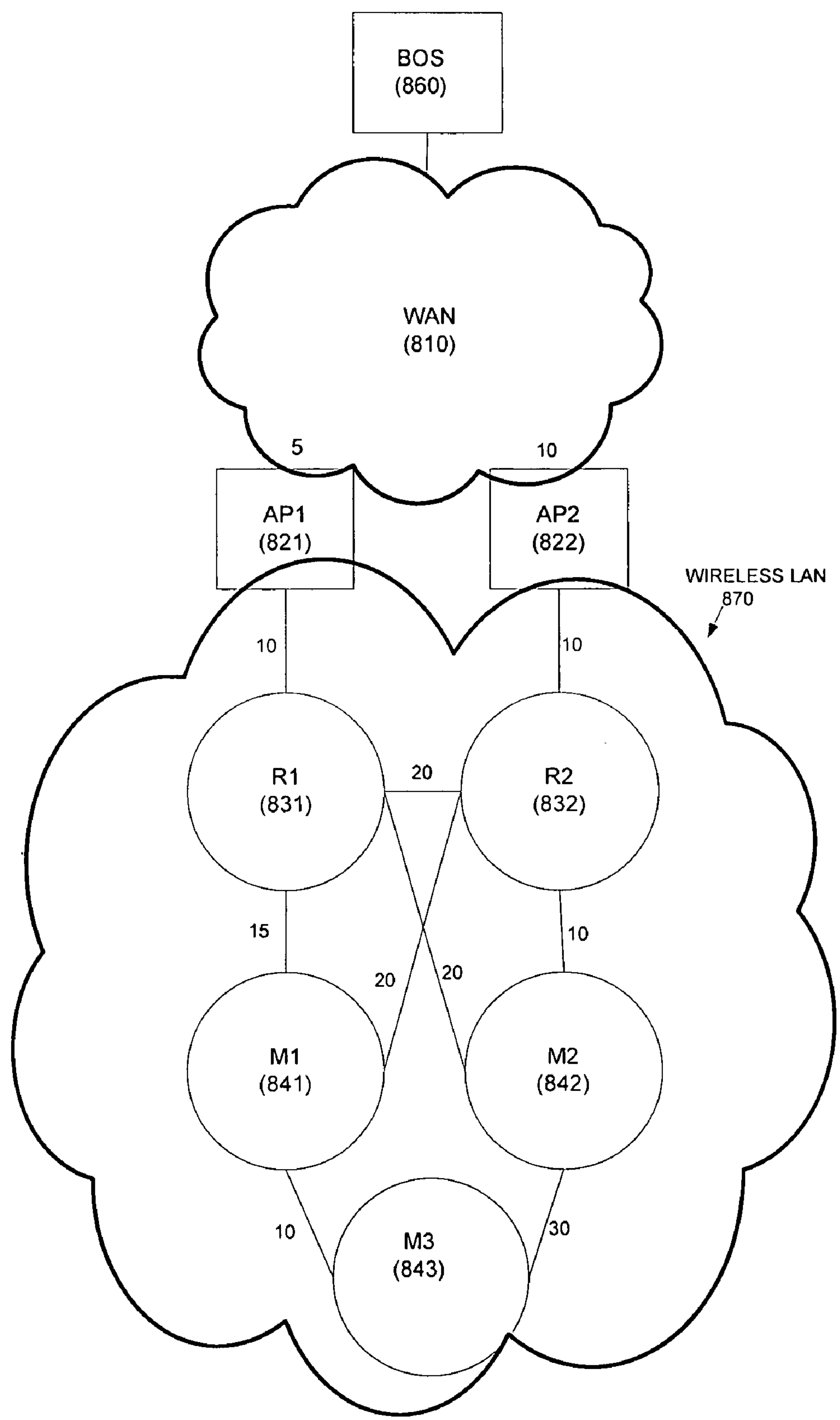
FIG. 8 represents a sample network where multiple Gateways, relays and end-point devices come up one by one.

A small-scale RF network depicted in FIG. 8 may be used to illustrate the preferred embodiment of how the route determination and propagation works in a typical scenario where the Gateways (821, 822, . . . ) and relays (831, 832, . . . ) are brought up first and then end-point nodes (841, 842, 843, . . . ) are brought up. As illustrated in FIG. 9, the link costs are mapped between nodes that establish communications with each other in the RF layer.

In the example illustrated in FIGS. 8 and 9, nodes M1, M2 and M3 each establish routing options to Gateways AP1 and AP2 for egress based on advertised path costs they receive from their neighbors including R1 and R2. In most cases, each node will have multiple, prioritized routing options via one or more of their neighbors in the next-hop (NH) configuration.

In one embodiment the routing mechanism can be adapted to be compatible with, and take advantage of, the Frequency-Hopping Spread Spectrum (FHSS) access scheme used in the wireless network of one embodiment, and leverage some of the inherent operational features of FHSS. Regular timing updates occur in the frequency hopping technique to address clock drifts at various nodes that should remain in synch to synchronously exchange packets. The routing protocol can keep packet overhead to a minimum by using the frequency hopping timing updates as "keep-alive" messages for sending link status information. Alternately, timing updates can also piggyback on any data packets that are forwarded. Unless otherwise noted, keep alive messages can be messages sent to update information, and may be sent regularly. “I'm alive” messages, which may also be used to update routing information, can be typically sent to announce, for example, when a node is initially powered on or introduced into a network.

In such an embodiment there can be no broadcast in the conventional sense in the routing protocol on a network utilizing FHSS scheme. Nodes can be targeted directly one by one for packet exchange. The routing protocol presented herein can use an abstraction of a broadcast whereby the link layer broadcast frame using the 8-byte MAC address of all ones (ff:ff:ff:ff:ff:ff in hex) is transmitted on every slot or channel starting at a randomly chosen slot and with a predetermined wait time between each transmission.

In one embodiment, the routing protocol described herein uses beaconing capability in an FHSS-based wireless network where a beacon is a periodic broadcast on a certain known frequency hopping sequence that all neighbors can recognize. The broadcast beacon that can be received by multiple neighbors can be more efficient than sending a routing update to each neighbor. A beacon can also be a shorter transmission with lower overhead than a routing update as there can be no acknowledgement messages and therefore less re-transmission packets upon failure.

In one embodiment the routing protocol described herein is designed to exploit the collective computing resources of the devices (nodes) in the network instead of relying on one Gateway at the root of the wireless network to calculate and distribute routes to all nodes. The end-point can select a preferred set of an ordered multiplicity of upstream nodes to use as next hops to go out to a WAN network through multiple Gateways (also referred to as APs) based upon the egress route advertisements with the associated path costs for each route and each hop. Upon failure of the primary route upstream or to the Gateway, the fall back to secondary routes and/or Gateways in the end-point's database can be immediate without any wait for a routing algorithm to re-converge since the routes are already pre-converged.

In one embodiment, the routing protocol allows nodes to migrate from one network to another network. When an upstream node advertises its known routes to a downstream node, it can send out a set of egress routes to available networks. The routing table at each node lists next hops through multiple Gateways for available networks, making a quick migration possible in case of the primary or default network becoming unavailable.

In one embodiment, each node registers itself with the upstream nodes it intends to use. The upstream node can now keep a downstream routing table entry for that node. Traffic destined for an end-point can now be routed primarily hop by hop where the next hop from the source or any node subsequently can be added to the message header of the packet. Of course, the destination address can be routinely included. Source routing where the ordered list of nodes through which the packet passes can be explicitly stated by the Gateway in the message header is also within the scope of this algorithm as a secondary option. The routing protocol disclosed herein can allow each node to have multiple next hops in its knowledge base and gives it the ability to choose from them for hop-by-hop forwarding. By doing so, the packets can circumvent problematic links without transmission failures and retransmissions, and can be more advantageous in a wireless network where the RF links tend to be transient in nature. In addition, this can avoid open-ended route discovery loops and problem route issues that source routing techniques are forced into in the presence of failed links.

As an integral part of the routing implementation in a utility network, there can be many functionalities that are implemented to assure that the network and the nodes are operating optimally. The disclosure herein describes several innovations that enhance the network performance, utilizing the same routing functionalities as described earlier.

Configuration Management

Nodes in the network may have the appropriate and latest configuration on them, and distribute this configuration information to other nodes in the network. For the utility back office server (BOS) to manage the network, the network nodes will need to have end-to-end reachability. The nodes can be properly configured and provided with adequate information about the overall network configuration, by utilizing upstream nodes as proxies for distributing configuration information.

There can be certain “settings” on network devices (nodes) that are field/site specific. These settings can be represented as configuration variables on the device. A configuration variable can be written to permanent storage once it has been set. Examples of these settings are: the DNS server that meters use, SNTP trap host, time zone information, etc.

Further, some configuration variables can also be “knobs” that can be used to tune how the network performs, e.g., the rate of sending network registrations, some smoothing parameters that may be used in the link-cost algorithm. There may be instances when the knob is tuned on a network-wide level to change the behavior of multiple devices in the network. To achieve these capabilities, it may be useful to distribute, implement and manage the configuration levels at the device and network level at all times.

The disclosure presented herein provides a method for executing configuration management. When nodes send a routing registration to the Gateway (NREG), they may include a SHA-1 hash (secure hash algorithm) of their configuration. If the SHA-1 hash does not match the hash stored on the Gateway, then the Gateway can send the node its new configuration. This SHA-1 hash may contain:

The list of variables to be included in SHA-1

The variables to be used in the SHA

The list of variable can be important, because if there is a need to include new variables in the configuration SHA-1, changing that list will cause a SHA-1 mismatch.

Time Synchronization:

This item is related to Configuration Management, but the uniqueness is in the concept of embedding time synchronization into network registration (NREG) messages. Instead of making separate requests to a back office time server, or a time server on the Gateway, when a device sends a NREG message, a new node or a rebooting node can be given time as a part of joining (re-joining) the network. This innovation brings several advantages including: (a) it can make timing information available almost immediately (b) can save at least two end-to-end packets.

The time-sync distribution may typically have a basic request/response mechanism in a network. Network nodes can be configured to request time from a specific MAC address. If that address is not configured in the nodes, they can ask for time from a Gateway in their routing table. Gateways can run SNTP (Simple Network Time Protocol). If the Gateways have time, they can respond in the following way: the response packet can be time-stamped by the application layer. When the packet is handed down, it can be “marked up” with a transmit delay at the MAC layer. The packet can have a field for total transmission delay, and this value can be updated at each hop. When the requesting node receives the response, it can add the time-stamp value and the transmission delay to get the current time. For efficiency there can be a "flag" in the packet that indicates it should be examined at each hop. This can be a general-purpose flag and may be reused for other protocols (for example: traceroute).

The timesync request may be sent as a standalone IP packet (for example: IPv4 or IPv6), or it may be combined in a network registration (NREG) packet for efficiency. It is not directly included in the network registration packet's payload, rather it is inserted in a data-link interface (DLI) TLV. The DLI TLV can be processed before the packet is handed up to the application. If the Gateway receives a time-sync request with a network registration, the reply can be included as a DLI TLV in the network registration acknowledgement (NREG ACK).

Local Load Management by Network Nodes

It can be desirable to avoid a situation where the nodes in the network "line up" behind the best-cost node and use it for routing. The node may quickly become too busy to forward traffic for all nodes that are using it. This can also make the routing fragile causing congestion and may make many nodes to become unreachable. Further, there can be a lot of flap to form new routes.

The innovation disclosed herein can force the preferred nodes to increase the cost advertised to a random set of neighbors. The preferred node(s) may receive(s) "keep" packets from nodes that are using it. The "keep" packet may be a request from the downstream node asking the upstream node to continue to include the node in its active packet forwarding (routing) list. If the preferred node has too many active keep nodes, it can increase its path-cost (according to an algorithm designed to achieve a specified but variable percentage decrease in packet traffic) and may send this new cost to a random selection of neighbors that it wants to drop or to a number of neighbor nodes selected according to a load balancing or traffic balancing algorithm. It may continue to send actual cost to the rest. A goal of this exercise is to discourage a smaller (but predetermined percentage) set of nodes to leave the preferred node. The algorithm can take into account two factors to avoid huge swings in network traffic:

- forcing large number of nodes seeking alternate routes and creating routing loops, by distributing "high" path costs to a large percentage of nodes.
- avoiding situations when downstream nodes continuing to receive actual path cost do not inadvertently advertise this cost to those nodes who have received increased path costs from the preferred node, forcing them under some circumstances to route the packets through the advertising nodes back to the preferred node.

Keep packets can be sent at regular intervals and may not vary like network traffic. They can be sent at roughly the same rate as the route advertisement period, so the nodes should have the keep feedback by the next advertisement period. In one embodiment, the rta (routing advertisement) period can be set at 20 min and the keep period can be set at 10 min.

It may be assumed that nodes do not switch to better or alternate routes unless their cost to the current upstream neighbor for egress increases by 10%. Therefore, in one embodiment, the algorithm used can force the upstream node to increase the cost of the route by ~10%. In one embodiment, the route cost increase is kept to less than 20%. Otherwise, it may trigger an rta if the nodes begin to switch and cause more traffic down stream.

The downstream nodes may also be selected randomly over all the nodes that the preferred upstream node is sending the rta to, not just to the nodes that are sending it the keep messages. This may discourage ones that will immediately switch to the preferred node if their routing situation forces them to opt to the preferred node. This is an effective preventive solution to avoid receiving a flood of registration requests from new downstream nodes.

Local Load Management by the Gateway

In some network situations, some Gateways can get overloaded with traffic in the field while other Gateways have very few nodes registered with them, thus causing a traffic imbalance. One exemplary method of managing traffic flowing into a Gateway may be to control the number of network nodes that register with the Gateway. On the other hand, the Gateway may control the registrations in such a way as to prevent nodes from getting stranded (i.e., they are unable to register with any Gateway).

In the routing algorithm disclosed herein, there can be at least three mechanisms for controlling the number of network nodes that register with a Gateway:

1) The number of hops a routing advertisement propagates out into the network
2) Gateway pushback (sending negative NREG ACKs)
3) Raising the routing cost that the Gateway advertises (in cases where the Gateway advertises routes in behalf of several selected nodes for providing egress to the registering nodes)

Hop-Count Control:

The routing algorithm disclosed herein has the ability to tune the number of hops that routing advertisements can be forwarded out into the network. The algorithm may also include a basic feedback control algorithm. One type of such algorithm may be Gateway-specific, where the Gateways adjust their hop count individually based on a target number of nodes that the Gateway wants to have in its registry. The second type may be a control loop that may be global where Gateways adjust their hop counts relative to each other. If one Gateway has more registered nodes than another, it can lower its hop count while the other one raises its hop count.

Gateway Pushback:

In one embodiment, the nodes can tell the Gateway if it is their primary, secondary or tertiary route when they register with the Gateway. The Gateway may have hard limits for the number of routes at which it starts sending negative acknowledgements (NACK) to tertiary and secondary nodes. In one embodiment, the Gateway may not send NACKs to primary NREGs in order not to let the nodes stranding.

Once the number of routes (nodes) that a Gateway has registered is above the limit set for managing the network traffic, the Gateway may start sending NACKs to any node trying to register as a tertiary route. The secondary NACK level may be higher than the tertiary NACK level. When this level is reached, the Gateway may start sending NACKs to both tertiary and secondary registrations.

When a node receives an NACK from a Gateway, it may place it in a hold-down list. Advertisements from a Gateway that are in the hold-down list may be thrown away. Placing the Gateway in the hold-down list may prevent the node from registering with it again immediately. A node may re-initiate registration with a Gateway after it receives a message to do so along with a route advertisement message from the Gateway. Once the Gateway is removed from the hold-down list, the node may re-register with the Gateway. In one embodiment, a Gateway can be placed on the hold-down list for 3 hours after an NACK. If a node loses all routes for more than a certain period, it may be assumed the network has changed significantly. In this case, Gateways that the node received NACKs from may be taken off the hold-down list.

In yet another embodiment, another variation of Gateway push-back may be used by having the Gateways synchronize globally with each other to set the secondary and primary levels. The level may be varied depending on how loaded the other Gateways are in comparison.

Route Evaluation (Discovery and Maintenance)

Link Evaluation

When a node is discovered, the MLME (MAC Layer Management Entity) of the source node may have no idea how good a neighbor the discovered node is. As such, it may want to evaluate its routing success to that node. In one embodiment, the evaluation phase includes sending a node 20 packets (configurable) and then calculating how many of them succeed (in this embodiment, an exponential filter can be used for evaluating the link info success). The source can send its latest link cost in the evaluation packet. Each evaluation packet can also be acknowledged. This provides that 1) the neighbor is able to talk back to the node, 2) the source node knows what the neighbor's link cost is to it. Knowing bi-directional link costs can be important for routing, because the traffic travels back downstream. The bi-directional link cost can also be included in the keep packet acknowledgement that the source node sends to the upstream nodes it may use for routing later.

The evaluation process may result in considerable packet traffic. A node may not be able to evaluate its neighbors all at once. However, the source node can evaluate the best nodes first so that the node may start participating in routing. Therefore, in one embodiment, the source node selects a configurable number of best RSSI neighbors, and evaluates them first. In one embodiment, the number is set at five (5).

Keep Mechanism

In a wireless ad hoc network, nodes may keep some information about their neighbors. This information can be stored in a list. As presented herein, the list is referred to as "nodeq".

The keep mechanism may have three purposes:

1) Let neighbor nodes know that they are upstream for routing and thus they should not drop the node sending them keep messages from the nodeq unless there is a real need;
2) Obtain bi-directional link info so that route path cost can be estimated;
3) in case a node was dropped from an upstream's nodeq they will know about this as soon as possible (in one embodiment before the 2×20 minute routing advertisement period has passed).

The keep mechanism can work as follows: the MLME of the source node can send keep packets every 10 minutes to the upstream nodes that the routing layer is using. The keep packets can be acknowledged, and the acknowledgement may contain the link cost from the upstream to the node.

1) When a node receives a keep message, it can mark the transmitting node as a keeping node, and may not cull that node from the nodeq.
2) Keep messages may give the node a way of knowing what the upstream link cost is. In some embodiments, if keep messages are not transmitted, there may only be very infrequent traffic from a downstream node to an upstream node. One example may be when a utility meter is read only once a day. In this case, the keep message traffic may be useful to keep routes stable in a network with very infrequent, bursty traffic. In the downstream direction there may be traffic every 20 minutes in the form of a routing advertisement. Sending periodic keep packets thus facilitates measuring of the link cost and communicating it to both nodes so that they may keep updates of bidirectional link cost.
3) When a node is dropped from an upstream's nodeq, the dropped node may receive a "cull" message from the upstream node immediately. However, if for some reason the dropped node does not receive that message (for example: when a node has just rebooted, etc.), it may infer that it was dropped if it does not receive the keep acknowledgement during its next keep message cycle. And this can happen faster than the exemplary time of about 40 minutes allotted for expiry of routing advertisements. Thus, it can make the network more reactive to changes and it can adapt faster.

Link-Evaluation Algorithm a) Direct Link Evaluation Via Info Success Percentage:

In one embodiment, the Data Link Layer (DLL) of the nodes communicates with neighbors by first polling them to see if the neighbor is available. If the poll acknowledgement is received, the data frame can be sent. This exchange is called a PADA exchange (POLL-ACK-DATA-ACK). When no acknowledgement (ACK) is received to the poll or data frame, a random back-off time can be generated, and re-transmission can occur when the back-off time has expired.

The term INFO refers to the data sent in the PADA exchange. The INFO frame (as opposed to the POLL) can have the quality that the transmitter knows the receiver will listen to it. Thus, a reason for the transmitter to fail to get an ACK to an INFO frame may bee either the INFO frame had errors or the ACK was received in error. Each node can compute the INFO success percentage (INFO %) to each of its neighbors using an exponentially weighted moving average formula. This computation can occur whenever any INFO frame is successfully transmitted or has failed; it may not be computed on POLL failure. The link cost algorithm can use the INFO % only due to the fact that it may better represent the link quality between directly connected links.

The back-off algorithm can be invoked whenever a POLL or INFO frame fails. A random back-off can be generated within the current back-off window. The current back-off window can be a geometrically increasing window; each consecutive failure can increase the window over which the random back-off is rolled. Thus, lower packet transmit-success percentages can result in greater back-offs.

The link cost can be designed to represent the total amount of time it takes, on average, to send a PADA transaction of fixed size. In one embodiment, this fixed size can be chosen to be 50 milliseconds. In some instances, 50 milliseconds may be ideal since it represents a typical packet data size in the network. Other PADA transaction sizes are entirely feasible. This time may then be calculated for various INFO % (the POLL can be assumed to always succeed), including the average amount of back-off time given the INFO %. This data can be kept by network nodes in a look up table. The link cost to a neighbor can be calculated by looking up the PADA transaction time in the table given the INFO %. The table can be, for example, kept in increments of 4%.

In one embodiment, bi-directional values can be used to get the final link cost. That is, the upstream node can send its INFO % success to the source node. The source node then may tabulate the "average time" for both the upstream's INFO % to it and source node's INFO % to the upstream node. This may result in a stable bi-directional route because routing can require a node to be able to send packets successfully both up and down stream.

b) Path Cost Evaluation

The path cost can be calculated by adding the link costs over a path. Because the link costs can be units of time (and not INFO %) they can be added up and do not need to be multiplied together.

Neighbor Query & Bad Neighbor List

The neighbor query can be a way for a node to quickly discover a large set of neighbors without having to transmit discovery packets randomly. When a node discovers neighbors, it can go into an "active" neighbor discovery period.

During this time, it can ask neighbors for the nodes that they know about. This initial inquiry may take place at a fast rate. Once the initial discovery process is stabilized and the node is in a normal operational mode (without interruptions, reboots, etc.), neighbor queries can be sent out more slowly. Also, to prevent the nodeq from being too unstable (growing in size, then culling etc), the node may not send neighbor queries if it has more than 90% of the desired number of nodes on its queue.

Neighbor queries may be done in a one-shot fashion. When a node receives a neighbor query, it may return information (MAC address, hopping sequence etc.) about its active neighbors, except for neighbors that are Interface Management Units (IMU's) (Interface Management Units are the units mounted on water and gas meters). The IMU's may be energy constrained, so it may not be desirable for them to be discovered and used as possible relay nodes by many meters.

There are some nodes that an inquiring node will receive in a neighbor query process that it cannot talk to. It may receive notification about these unreachable nodes in multiple neighbor queries. These nodes may be placed on the bad nodeq to prevent nodes from continuously trying to talk to neighbors it is already aware it could not talk to. Nodes may also be placed on the bad node list when they are removed for any reason (some examples are: repeated down-time and reboots, very poor link and path costs, alerts from the network server and the gateway of exclusion nodes, security alerts, etc.). Nodes on the bad node list may not be re-added to a node's nodeq, unless they have rebooted and their link conditions have been validated. The bad nodeq also helps stabilize the actual nodeq, because nodes may not be able to reacquire other nodes immediately after they were removed. Nodes may be removed from the bad nodeq after a specified period.

Nodes may also be removed from the bad nodeq if a node does not have enough neighbors. To qualify for reinstatement into the regular nodeq, the node in the bad nodeq list may have been accessed by the reinstating node in the recent past and has some link information in its storage. This can assure that the node could talk to them at one time and they would have been rediscovered in neighbor queries if they were not on the bad nodeq.

Culling

The process of culling may be to eliminate a number of neighbors from a node's nodeq before it runs out of memory to allocate node pointers. Culling may be done preemptively so that there is space for new/disconnected nodes to connect to a particular node, and also to control traffic. The choice of the number of nodes and which nodes to cull can have an impact on connectivity and network operation.

Goals of culling include:

Keep the nodeq small to minimize network congestion and interference

Keep room for new/disconnected meters on the nodeq

Cull infrequently to minimize instability

Minimize culling's impact on routing

Keep nodes with high link quality

A first step in designing the culling algorithm may be to decide that the optimal number of nodes in the nodeq should be 100-110 nodes (based on traffic). The culling algorithm may have hysteresis built into it. This implies that there may be a high level and a low level of nodes on the nodeq. Once the number of nodes exceeds the high level, node may be culled until the nodeq is at the low level.

A next step in the culling algorithm may be for the source node to decide which nodes to cull in the event that culling is required. In order to not disrupt the routing, the routing layer of the source node may mark the nodes that it is currently using as upstreams. These nodes may not be culled. Next, nodes that are using the source node as upstreams may also not be culled. Furthermore, the source node may avoid culling infrastructure nodes since they are useful in reducing the number of routing hops that packets take, and also in the event of network outage. Infrastructure nodes can be relays, gateways and Field Service units (FSUs). FSUs may not be culled to enable field debug, firmware update and other maintenance functions. Each node may be instructed to keep a certain number of gateways and relays on its nodeq (the number may be expressed as a percentage of nodeq size). Finally, when it has a route to an AP, a node may try to avoid culling nodes that have not yet acquired routes. These nodes could potentially acquire a route through the source node, so they should remain on the nodeq.

The algorithm may work as follows in one embodiment: Each time that N nodes are to be culled, a total of three passes may be made through the nodeq to select nodes to cull. Each pass may select nodes according to link quality (for example, lowest link quality in a pass gets culled). The first pass may be made if the node already has a route. If the node does not have a route, it can skip the first pass and go directly to the criteria for culling described below in the second pass. During the first pass a node may try to find N neighbors that already have independent routes (nodes not using each other as upstreams). A node may know which neighbors it is using, and which neighbors are using it, because those that are not using it may send it routing advertisements every 20 minutes. If N nodes are found during the first pass, no further passes may be made and the selected nodes may be culled. In the second pass the "have a route" constraint may be relaxed and nodes that do not have routes may be culled. However, in this pass nodes that are sending keep messages may not be selected. In the third pass even nodes that send keep messages may be selected for culling. Ideally the third pass is not reached very often as it can disrupt routing.

When an individual node is culled it may be sent a cull message to let it know that it is no longer on the nodeq. This will prevent the asymmetric situation that the culled node may still communicate with the culling node, but the culling node may no longer communicate with it due to the fact that the culled node is no longer on the nodeq.

When a node is selected for culling, the cull sched flag may be marked and a cull message may be scheduled through the MLME scheduler. After the cull message has been successfully transmitted, the designated node may be discarded. Occasionally, it may not be possible to transmit the cull message to the node. In that case the node may be discarded after a few retries.

Contingency Routing Schemes

Reverse Source Route

When a node has lost its network (in hold-down) or for some reason receives a packet from a Gateway that it is not configured for, this node may be unreachable. There can be methods to set up static routes to the node, but these may be time-consuming. Further, it may be difficult to insert static routes to nodes because one may need to insert the route in the node's routing table before one may get a confirmation from it/talk to it.

The disclosure presented herein provides a solution to this problem. When a node receives a source-routed packet from a Gateway that it does not have in its routing table (or multihome IPv6 prefix configured for), it may automatically configure the requisite multihome, reverse the source route and insert that in its IPv6 and its routing tables. The route may only be valid for a short time (for approximately eight seconds, in one embodiment) so that the node may reply to the AP. In one embodiment, each time the AP sends the node a packet the route may be reinserted even if it is not valid anymore.

Downstream Diversity Via Crumb Routes

In some exemplary embodiments, nodes may only keep routes for the access point in the network. Thus they may not have any routes to other nodes. In the downstream direction, packets may be source routed by a Gateway. If they fail for a particular hop, there may be no way to forward them on (nodes may not keep routing tables for all other nodes in the network.

The disclosure presented herein can provide a method to overcome this and introduce downstream diversity. In one embodiment, nodes may insert crumb routes into their routing tables for destinations that they are forwarding traffic for. A crumb route can be inserted into its routing table when a node forwards a packet from a downstream source node. The forwarding node can know the MAC address of the source node, as well as the node immediately downstream from it that relayed the packet over the last hop. The forwarding node can insert a layer 2 route to the source node going through the immediate downstream node. Thus, when the forwarding node receives a packet destined for the original source node, it has a route to forward the packet along. In one embodiment, if a node could not forward a packet along the source route that was in the packet, it may choose the crumb route. In one exemplary embodiment, when determining if it is unable to forward a packet, the node can hand it to the MAC layer, and if the MAC layer could not send it within 8 seconds up to a maximum of 32 tries, it can consider the packet as unable to be forwarded. In one embodiment, nodes can store every crumb route they see. In another embodiment, node can store two crumb routes per destination (with newer ones replacing older ones). In one embodiment, the crumb routes can be in a first in-first-out type of queue. In one embodiment, there may be space for 2000-3000 routes. In one embodiment, the older routes can be replaced by newer ones.

Power Management

The power management scheme can alleviate interference/congestion in very dense areas of deployment in a utility network by reducing the nodes' transmit power. In one embodiment, a plurality of the nodes may be maintained at low power, but a few nodes may be left to operate with high transmit power so that they can be used as links out of the dense area without increasing number of hops for routing. Another feature of this scheme is that nodes can discover and adjust their power levels automatically without operations interference. In one embodiment the hardware can adjust its transmit power. One way that it may do this is to present a scale from 0 to 65 units on a mostly linear scale. A value of 0 may represent, for example 23 dB, whereas a value of 65 may be 30 dB on a mostly linear scale.

An exemplary power management scheme may be outlined as follows:

To detect such a situation: The source node may monitor how many nodes it culls and also can track cull messages from neighbor nodes that have good RSSI/INFO %. The total number of nodes culled by a source node in its transmit (TX) message, and the total number of nodes culled by another node in source node's receive (RX) message may be defined as K. If the number K is more than 100, for example, (or another configuration number), then the node may be in a high-density deployment. In one embodiment, the number 100 was chosen because of typical traffic analysis in utility networks.

After the high-density has been detected: The node may employ a random number to determine how much it reduces the power. In some embodiments, the power range may be from 35 to a minimum of 1. With a percentage of 1/(4K), the node may leave its power at maximum. Otherwise, if K>200, it may choose a power level randomly in the range of 1-5. In certain other cases, the chosen value may be in the range of 5-10. Thus, after the first decrease, there is a possibility of a second decrease. At the end of the power decreases there may be about 2-4 nodes out of a 100 or so nodes with maximum power.

When a node increases the power: If a node has too few nodes on nodeq (<25 nodes) and has already done a "neighbor restart" where the culled nodes in the bad neighbor list have been removed and two hours have passed to re-acquire neighbors, and a node still has <50 nodes on its nodeq, then the node may increase the power up by 5 points.

Routing Outage Restoration

When a network node reboots, there may be a necessity to notify the utility back office server that it has rebooted after an outage event of specific characteristics (system-wide outage, local network outage, node equipment outage, other).

In order to save packets in the utility network, it may be inefficient to send a separate notification informing the back office server each time a node has rebooted. Instead, in the network registration, each node may include an element that informs the Gateway that the node has rebooted. Along with that information, the node may inform the Gateway about the following:

How long it has been up

What was the nature of the outage

Whether or not it has "cleanly" or "uncleanly" rebooted

Is there a core on the node

What the core version is (if there is a core)

The information may be compiled at the Gateway for network-wide status. The Gateway may form an SNMP TRAP that may be sent to the back office server. Thus, the method saves network traffic and more quickly informs the back office server that nodes in the field have gone down or rebooted.

The subject matter has been described with reference to particular embodiments. However, it will be readily apparent to those skilled in the art that it is possible other embodiments described above. This may be done without departing from the spirit of the claims.

Thus, the embodiments are merely illustrative and should not be considered restrictive in any way. The scope is given by the appended claims, rather than the preceding description, and all variations and equivalents which fall within the range of the claims are intended to be embraced therein.

What is claimed is:

1. A method of route evaluation in a network, comprising:

sending, from a source node to a receiving node, a predetermined number of packets;

acknowledging, by the receiving node, each packet received from the source node;

calculating, by the source node, a link cost value based on the number of packets, from among the packets comprising said predetermined number of packets, that are acknowledged by the receiving node;

averaging successively calculated link cost values to determine a link cost; and sending, by the source node to the receiving node, the link cost.

2. The method of claim 1, wherein the predetermined number of sent packets is 20.

3. The method of claim 1, wherein the step of acknowledging by the receiving node comprises sending the link cost from the receiving node.

4. The method of claim 1, further including the step of selecting a designated number of nodes with the best received signal strength indicator as receiving nodes to which said predetermined number of packets are to be sent.

5. The method of claim 4, wherein the designated number of nodes is 5.

6. The method of claim 1, wherein the nodes are part of a frequency-hopping spread spectrum wireless utility network.

7. The method of claim 1, wherein the steps of sending the predetermined number of packets and calculating a link cost are performed by the source node during an evaluation phase in which the source node determines the quality of a link to a neighbor node.

8. The method of claim 7, wherein the evaluation phase occurs during the process of discovering the neighbor node.

9. The method of claim 7, wherein the evaluation phase includes the steps of selecting a preset number of nodes with the best received signal strength indicator as receiving nodes, and sending the predetermined number of packets to the selected receiving nodes.

10. The method of claim 1, further comprising:

periodically sending, by the source node, a keep packet to an upstream node, notifying the upstream node to maintain the source node on a list of nodes for which the upstream node forwards packets; and sending, by the upstream node to the source node, an acknowledgment of the keep packet, wherein the acknowledgement comprises a link cost from the upstream node to the source node.

11. The method of claim 10, wherein the sending, by the source node, of a keep packet to the upstream node occurs approximately every ten minutes.

12. The method of claim 10, wherein the keep packet includes link cost from the source node to the upstream node.

13. The method of claim 10, further including the following steps:

transmitting a message from the upstream node to the source node when the source node is removed from said list; and in response to receipt of said message at the source node, selecting a new upstream node to which said keep packets are periodically transmitted.

14. The method of claim 10, further including the following steps:

transmitting an acknowledgement from the upstream node to the source node when a keep packet is received at the upstream node; and in response to a lack of receipt, at the source node, of an acknowledgement for a keep packet transmitted by the source node, selecting a new upstream node to which said keep packets are periodically sent.

15. A method of route evaluation in a wireless network, comprising:

discovering, at a first node, a neighbor node in the wireless network;

transmitting a predetermined number of packets from the first node to the neighbor node;

acknowledging, by the neighbor node, each packet successfully received from the first node;

calculating, by the first node, a link cost value based, at least in part, on the number of said predetermined number of packets that are acknowledged by the neighbor node;

averaging successively calculated link cost values to determine a link cost; and transmitting the calculated link cost from the first node to the neighbor node.

16. The method of claim 15, wherein the first node discovers a plurality of neighbor nodes in the wireless network, and wherein the method includes the following steps:

selecting, from among said plurality of discovered neighbor nodes, a preset number of the neighbor nodes having the highest signal strength;

transmitting said predetermined number of packets from the first node to each of the selected neighbor nodes;

calculating, for each of the selected neighbor nodes, a link cost based on the number of said predetermined number of packets that are successfully received by that neighbor node; and transmitting the link cost calculated for each of the selected neighbor nodes from the first node to the respective neighbor nodes.

* * * * *